United States Patent
Otaka

(10) Patent No.: US 8,279,209 B2
(45) Date of Patent: Oct. 2, 2012

(54) CIRCUIT FOR DRIVING LIGHT-EMITTING ELEMENT, AND CELLULAR PHONE

(75) Inventor: Nobuyuki Otaka, Kadoma (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 963 days.

(21) Appl. No.: 12/269,588

(22) Filed: Nov. 12, 2008

(65) Prior Publication Data

US 2009/0135168 A1 May 28, 2009

(30) Foreign Application Priority Data

Nov. 16, 2007 (JP) ................................ 2007-298139

(51) Int. Cl.
G09G 5/00 (2006.01)

(52) U.S. Cl. ........ 345/208; 345/204; 345/206; 345/209; 345/211; 345/212

(58) Field of Classification Search ........ 345/77, 345/82, 95–100, 204–212; 315/169.3, 294; 463/25; 455/566; 379/372; 257/94

See application file for complete search history.

(56) References Cited

U.S. PATENT DOCUMENTS

| | | | | | |
|---|---|---|---|---|---|
| 4,339,632 | A | * | 7/1982 | Early et al. ............... | 379/357.04 |
| 4,514,789 | A | * | 4/1985 | Jester ............... | 362/95 |
| 4,541,703 | A | * | 9/1985 | Kataoka et al. ............... | 396/157 |
| 5,790,653 | A | * | 8/1998 | Fairbanks et al. ............. | 379/372 |
| 5,821,858 | A | * | 10/1998 | Stone ............... | 340/573.1 |
| 6,466,744 | B1 | * | 10/2002 | Hosaka et al. ............... | 396/155 |
| 6,826,365 | B1 | * | 11/2004 | Constable ............... | 396/206 |
| 7,015,825 | B2 | * | 3/2006 | Callahan ............... | 340/815.45 |
| 7,554,065 | B2 | * | 6/2009 | Shimizu ............... | 250/205 |
| 2002/0197522 | A1 | * | 12/2002 | Lawrence et al. ............... | 429/34 |
| 2004/0207341 | A1 | * | 10/2004 | Callahan ............... | 315/291 |
| 2004/0246208 | A1 | * | 12/2004 | Machida ............... | 345/76 |
| 2005/0168415 | A1 | * | 8/2005 | Noda et al. ............... | 345/76 |
| 2005/0168965 | A1 | * | 8/2005 | Yoshida ............... | 362/3 |
| 2005/0212000 | A1 | * | 9/2005 | Suzuki et al. ............... | 257/94 |
| 2007/0052983 | A1 | * | 3/2007 | Nakajima ............... | 358/1.6 |
| 2007/0080905 | A1 | * | 4/2007 | Takahara ............... | 345/76 |
| 2008/0030434 | A1 | * | 2/2008 | Yamazaki et al. ............... | 345/76 |
| 2008/0179498 | A1 | * | 7/2008 | Shimizu ............... | 250/214 AL |
| 2008/0191965 | A1 | * | 8/2008 | Pandozy ............... | 345/8 |

FOREIGN PATENT DOCUMENTS

JP    2007-108545    4/2007

OTHER PUBLICATIONS esp@cenet patent abstract for Japanese Publication No. 2007108545, Publication date Apr. 26, 2007 (1 page).

* cited by examiner

*Primary Examiner* — Prabodh M Dharia
(74) *Attorney, Agent, or Firm* — Osha Liang LLP

(57) ABSTRACT

A light-emitting element driving circuit is installed on a second substrate, which is connected via a signal line to a first substrate, on which is mounted a CPU configured to generate an LED drive control signal. The light-emitting element driving circuit includes a pulse generation unit configured to start and stop an operation based on the LED drive control signal and output an LED drive signal when the pulse generation unit is in an active state, an LED oscillator configured to supply a reference pulse signal to the pulse generation unit, and an LED driver unit configured to cause a light-emitting element to perform a flickering operation based on the LED drive signal.

5 Claims, 5 Drawing Sheets

CIRCUIT FOR DRIVING LIGHT-EMITTING ELEMENT, AND CELLULAR PHONE

PRIORITY INFORMATION

This application claims priority to Japanese Patent Application No. 2007-298139, filed on Nov. 16, 2007, which is incorporated herein by reference in its entirety.

BACKGROUND OF THE INVENTION

1. Field of the Invention

The present invention relates to a light-emitting element driving circuit and a cellular phone, and more particularly to a light-emitting element driving circuit provided in an apparatus including two substrates, and a cellular phone incorporating the light-emitting element driving circuit.

2. Description of the Related Art

If a user does not respond to an incoming call (phone call, e-mail, etc.), a cellular phone causes a light-emitting element such as a light emitting diode (LED) to perform a flickering operation to notify the user of the presence of an unattended incoming call. For example, as discussed in Japanese Laid-Open Patent Application No. 2007-108545, a light-emitting element driving apparatus installed on a portable device includes a light source unit, which includes a light-emitting element and a driving unit supplying constant drive current to the light-emitting element. Furthermore, the driving apparatus includes a control unit, which operates to control an overall system of the portable device, a battery power source capable of supplying electrical power to the light source unit and the control unit, and a charger element to be charged by the battery power source and supplying electrical power to the light source unit.

SUMMARY OF THE INVENTION

According to the apparatus discussed in Japanese Laid-Open Patent Application No. 2007-108545, if a controller such as a central processing unit (CPU) of the portable device is activated every time the LED performs the flickering operation, a significant amount of current flows, and accordingly a large amount of electrical power is consumed by the CPU. To solve the problem, an oscillator that is constantly oscillating to constitute a clock can be used to provide a pulse generation circuit, which can generate a pulse signal to control an LED driving apparatus.

A recent trend of cellular phones, as one representative portable device, is a two-part body represented by a folding type and a sliding type, which includes two body parts each incorporating a substrate. According to such an arrangement, an effective layout for the CPU, the light-emitting element, and the pulse generation circuit is an important factor in determining the design of each cellular phone. The cellular phone cannot be downsized if the layout of the above-described electronic parts is inappropriate.

An object of the present invention is to provide a light-emitting element driving circuit and a cellular phone incorporating the light-emitting element driving circuit, which can realize an appropriate layout of electronic parts on two substrates of the cellular phone.

According to an aspect of the present invention, a light-emitting element driving circuit is installed on a second substrate connected via a signal line to a first substrate, on which is mounted a control circuit configured to generate an LED drive control signal. The light-emitting element driving circuit includes a pulse generation unit configured to start and stop an operation based on the LED drive control signal, and output an LED drive signal when the pulse generation unit is in an active state, an LED oscillator configured to supply a reference pulse signal to the pulse generation unit, and an LED driver unit configured to cause a light-emitting element to perform a flickering operation based on the LED drive signal.

According to the above-described arrangement, the pulse generation unit is provided in the light-emitting element driving circuit, which performs driving control for the light-emitting element, and is provided on the second substrate. Therefore, compared to a comparative case where the pulse generation unit is provided on the first substrate, reduction of signal lines connecting the first substrate and the second substrate can be realized. Accordingly, the present invention can provide a light-emitting element driving circuit capable of appropriately disposing electronic parts on two substrates, and a cellular phone incorporating the light-emitting element driving circuit.

Furthermore, in the light-emitting element driving circuit according to the present invention, it is desired that the LED oscillator is a circuit having a lower frequency accuracy with respect to the reference pulse signal compared to a control oscillator in the control circuit mounted on the first substrate.

Furthermore, in the light-emitting element driving circuit according to the present invention, it is desired to provide a boosting circuit to perform boosting based on a voltage applied to an anode electrode of the light-emitting element, wherein the LED driver unit and the boosting circuit are in a sleep state when the LED drive signal is in an L period.

According to another aspect of the present invention, a cellular phone includes a first substrate on which is mounted a control circuit, and a second substrate connected to the first substrate via a signal line and on which is mounted a light-emitting element driving circuit configured to drive a light-emitting element. The light-emitting element driving circuit of the second substrate includes a pulse generation unit configured to start and stop an operation based on an LED drive control signal and output an LED drive signal when the pulse generation unit is in an active state, an LED oscillator configured to supply a reference pulse signal to the pulse generation unit, and an LED driver unit configured to cause the light-emitting element to perform a flickering operation based on the LED drive signal.

Moreover, in the cellular phone according to the present invention, it is desired that the LED drive control signal is a signal to be generated when the cellular phone has an unattended incoming call.

BEST MODE FOR CARRYING OUT THE CLAIMED INVENTION

Embodiments of the present invention are described below with reference to the drawings. A light-emitting element according to an embodiment is installed on a cellular phone and can be installed on any other electronic device.

Figure 1:
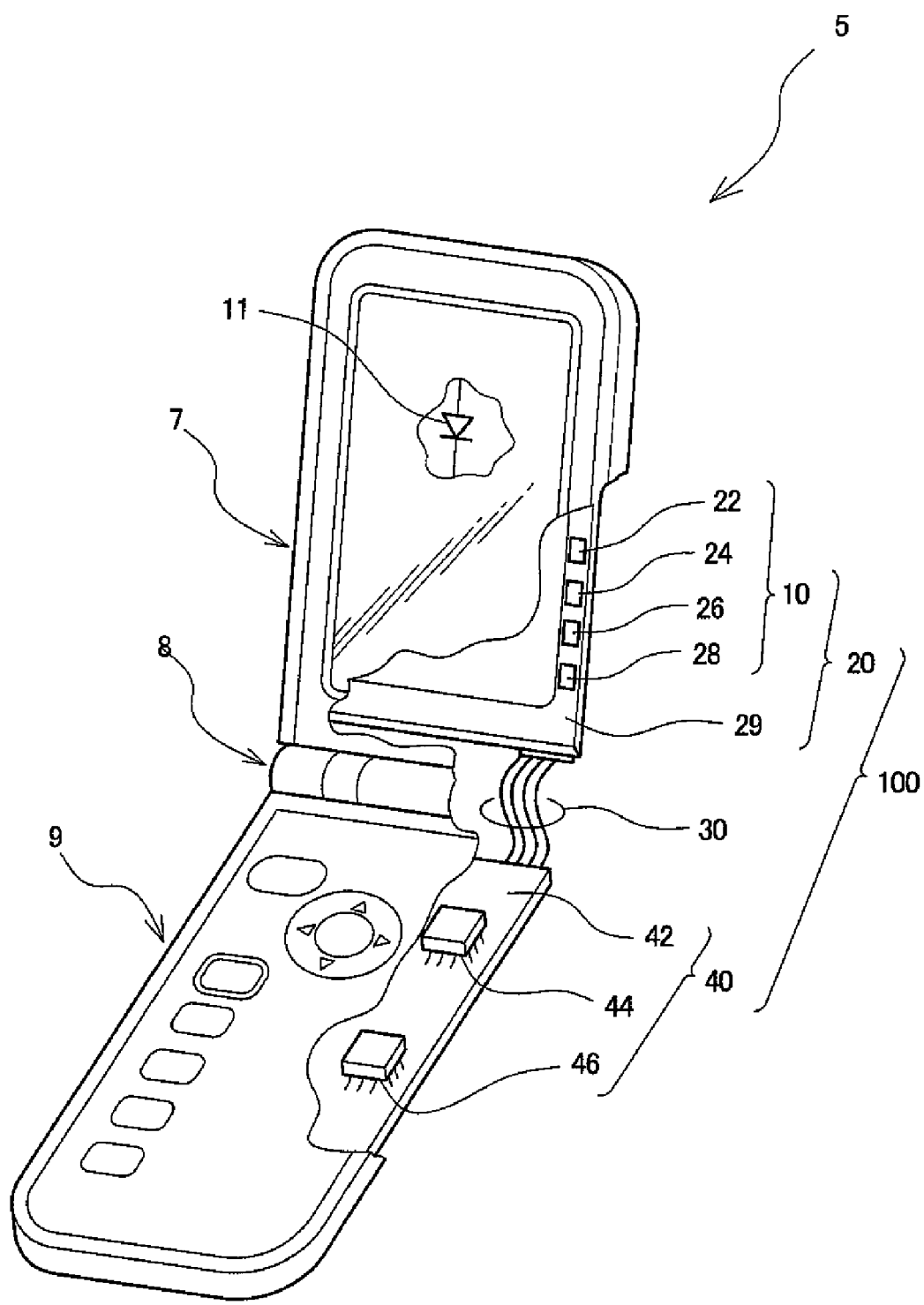
FIG. 1 is a perspective view illustrating a cellular phone incorporating a light-emitting element driving circuit according to an embodiment of the present invention.

FIG. 1 illustrates a cellular phone 5. The cellular phone 5 is a folding type telephone including two body parts. One body part of the cellular phone 5 is a liquid crystal unit 7 including a liquid crystal display unit. The other body part of the cellular phone 5 is an operation unit 9 enabling a user to operate the cellular phone 5. The cellular phone 5 includes a connecting unit 8, including signal lines connecting the liquid crystal unit 7 and the operation unit 9 (i.e., two body parts).

The liquid crystal unit 7 includes a light emitting diode (LED) 11 notifying a user of the presence of any unattended incoming call, and a second substrate unit 20 on which a light-emitting element driving circuit 10 is disposed. The light-emitting element driving circuit 10 operates to drive the LED 11. Furthermore, the liquid crystal unit 7 includes an image display apparatus serving as a display unit incorporating liquid crystal elements (not illustrated), and a driving circuit for the image display apparatus. The LED 11 is a light-emitting element, which can emit light when a voltage is applied in a forward direction between a cathode (negative electrode) and an anode (positive electrode). The second substrate unit 20 is described below in more detail.

The operation unit 9 includes a first substrate unit 40 on which is mounted a control circuit of the cellular phone 5, and a plurality of operation buttons enabling a user to operate the cellular phone 5. For example, the user can enter a telephone number via the buttons of the operation unit 9 to make a telephone call. The first substrate unit 40 is described below in more detail.

The connecting unit 8 includes a cable portion 30 connecting the first substrate unit 40 and the second substrate unit 20. The cable portion 30 includes a plurality of cable lines, via which the second substrate unit 20 and the first substrate unit 40 are electrically connected. The cable portion 30 is, for example, Flexible Printed Circuits (FPC).

In the cellular phone 5, a portion including the cable portion 30, the first substrate unit 40, and the second substrate unit 20 (which incorporates the light-emitting element driving circuit 10) can be referred to as a light-emitting element driving apparatus 100. The first substrate unit 40 includes a first substrate 42 on which is mounted a control circuit operating to control the cellular phone 5, a central processing unit (CPU) 44 disposed on the first substrate 42, and a control oscillator 46 disposed on the first substrate 42. The second substrate unit 20 includes a second substrate 29 on which is mounted an electronic circuit dedicated to the image display apparatus, the light-emitting element driving circuit 10 disposed on the second substrate 29, and a driving circuit (not illustrated) for the image display apparatus. First, the first substrate unit 40 is described below. Subsequently, the second substrate unit 20 will be described.

Figure 2:
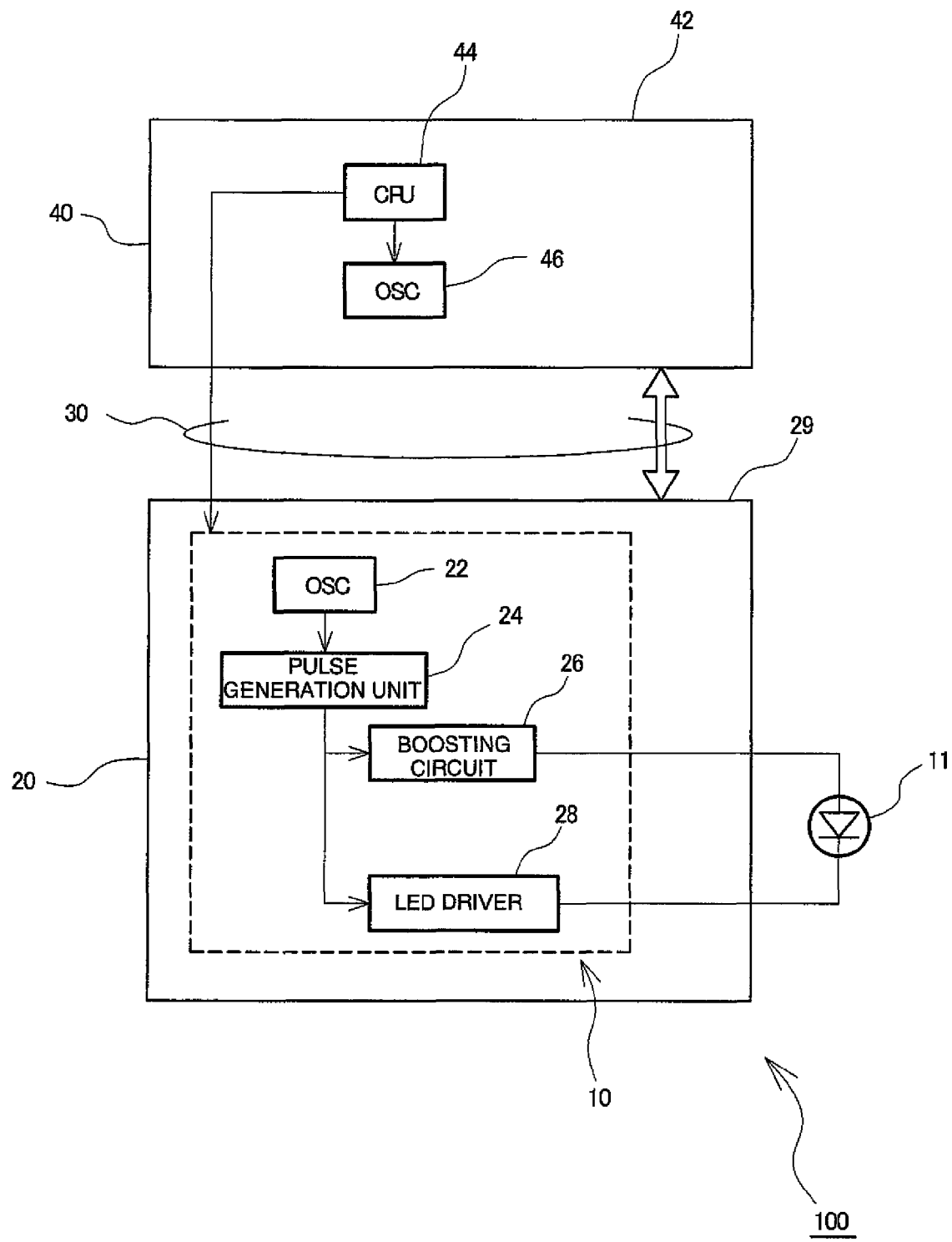
FIG. 2 is a block diagram illustrating a light-emitting element driving apparatus including the light-emitting element driving circuit according to an embodiment of the present invention.

FIG. 2 is a block diagram illustrating the light-emitting element driving apparatus 100 including the light-emitting element driving circuit 10. The CPU 44 is a microcomputer capable of controlling various functions performed by the cellular phone 5. The CPU 44, provided on the first substrate 42, is electrically connected to the control oscillator 46 and a memory circuit (not illustrated). In the present embodiment, the CPU 44 has a function of outputting an LED drive control signal to be transmitted to a pulse generation unit 24 that generates an LED drive signal. The LED drive signal is a reference signal that causes the LED 11 to perform a flickering operation to notify a user of the presence of an unattended incoming call in a case where the user did not respond to the incoming call (phone call, e-mail, etc.) received by the cellular phone 5.

The control oscillator 46 is an electric circuit capable of generating sustainable alternating current. The control oscillator 46 can include a crystal oscillator. An oscillation circuit constituted by the crystal oscillator can generate a pulse signal. The pulse generated by the control oscillator 46 is generally used as a reference pulse to be supplied to a clock circuit (not illustrated) and is therefore required to be accurate and stable in frequency. The control oscillator 46 and the CPU 44 are electrically connected.

The light-emitting element driving circuit 10 includes an LED oscillator 22, the pulse generation unit 24, a boosting circuit 26, and an LED driver unit 28.

The LED oscillator 22 is an oscillation circuit including a solid-state oscillator. The LED oscillator 22 is exclusively used to generate an LED drive signal 52. Frequency accuracy required for the LED oscillator 22 is lower that the accuracy required for the control oscillator 46. Frequency stability of the LED oscillator 22 does not need to be high. Accordingly, compared to the control oscillator 46, the LED oscillator 22 can be constituted by a low-price and compact oscillation circuit. The LED oscillator 22 is connected to the pulse generation unit 24. The LED oscillator 22 can be a circuit that is constantly oscillating, or can be a circuit that starts oscillating in response to a command supplied from the CPU 44.

The boosting circuit 26 has a function of performing boosting based on a voltage applied to the anode terminal of the LED 11 and supplying the boosted voltage to the LED 11. The boosting circuit 26 is connected to the LED 11 and the pulse generation unit 24.

The LED driver unit 28 is a circuit including a current circuit, which operates to supply drive current to the LED 11. When the LED 11 receives the current supplied from the LED driver unit 28, the LED 11 is in an ON state. When the LED 11 receives no current, the LED 11 is in an OFF state. Luminance of the LED 11 can be controlled by changing the current value of the current circuit provided in the LED driver unit 28. The LED driver unit 28 is connected between the LED 11 and the pulse generation unit 24.

Figure 3:
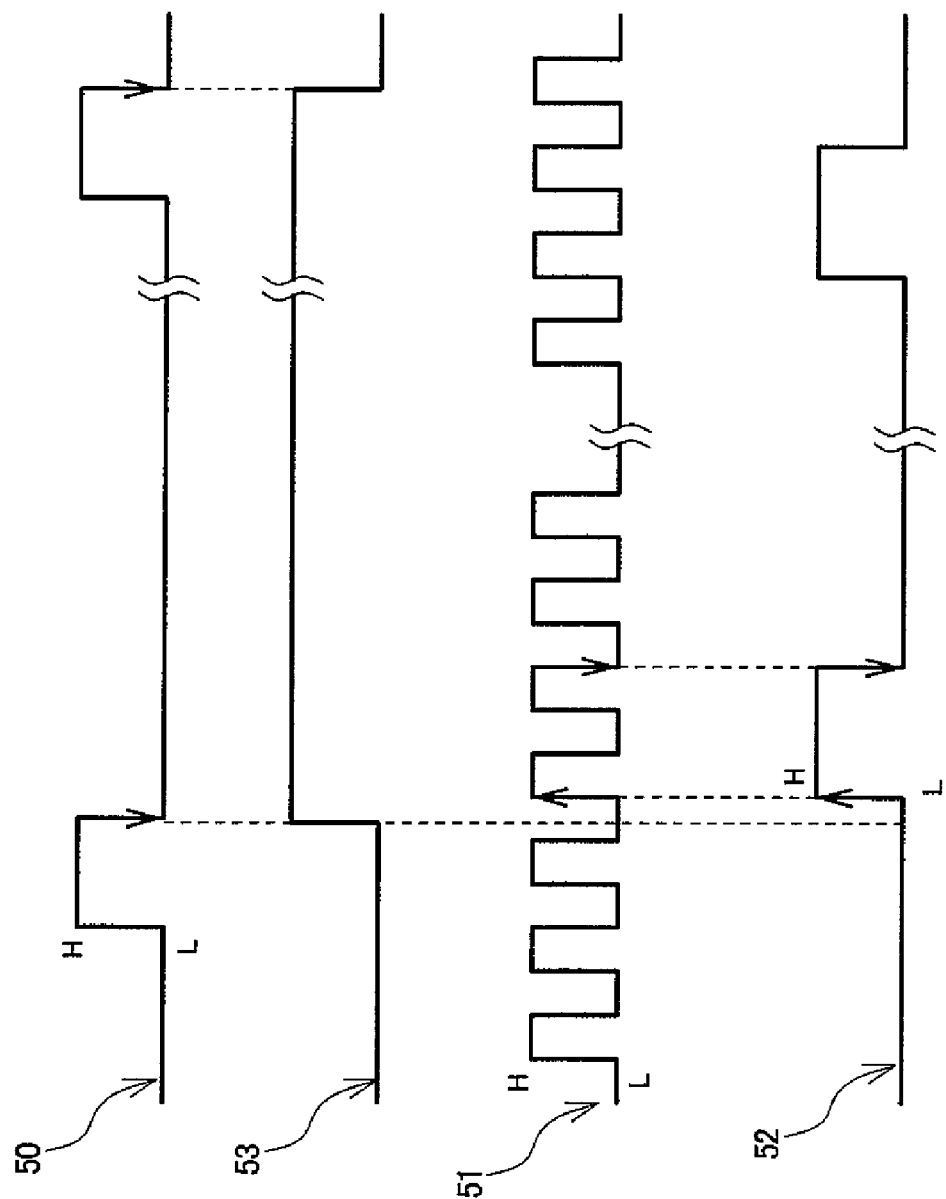
FIG. 3 illustrates an LED drive control signal, a reference pulse signal, and an LED drive signal.

FIG. 3 illustrates an LED drive control signal 50, a reference pulse signal 51, the LED drive signal 52, and a pulse generation unit activation signal 53. In FIG. 3, the abscissa axis represents time and the ordinate axis represents voltage. First, the LED drive control signal 50 rises from low (L) to high (H) when the cellular phone 5 has an incoming call. Then, the signal 50 falls from high (H) to low (L) as a user did not respond to the incoming call. Subsequently, the LED drive control signal 50 rises again from low (L) to high (H) when the user presses a button of the operation unit 9 to confirm the presence of an unattended incoming call. The signal 50 then falls again from high (H) to low (L).

The LED drive control signal 50 is transmitted from the CPU 44 to the light-emitting element driving circuit 10. When the pulse generation unit activation signal 53 is in a high (H) period, the pulse generation unit 24 is active. When the pulse generation unit activation signal 53 is in a low (L) period, the pulse generation unit 24 is inactive. The pulse generation unit activation signal 53 becomes high (H) in synchronization with an H→L change of the LED drive control signal 50 (in the case of unattended incoming call). Then, the pulse generation unit activation signal 53 becomes low (L) in synchronization with a subsequent H→L change of the LED drive control signal 50 (when the user confirmed the unattended incoming call).

The reference pulse signal 51, i.e., a reference pulse signal output from the LED oscillator 22, is a signal fluctuating between high (H) and low (L) levels at the period of, for example, 64 kHz.

The LED drive signal 52 is a signal to be supplied to the boosting circuit 26 and the LED driver unit 28. As described above, the boosting circuit 26 and the LED driver unit 28 are functionally cooperative to turn the LED 11 on in the high (H) period and turn the LED 11 off in the low (L) period. When the LED drive signal 52 is in the high (H) period, both the boosting circuit 26 and the LED driver unit 28 are in an ordinary operation state. When the LED drive signal 52 is in the low (L) period, both the boosting circuit 26 and the LED driver unit 28 are in a sleep state.

The pulse generation unit 24 receives the reference pulse signal 51 from the LED oscillator 22 Then, the pulse generation unit 24 generates the LED drive signal 52 illustrated in FIG. 3, which is triggered by the first rise of the reference pulse signal 51 following the fall of the LED drive control signal 50. If the reference pulse signal 51 is a pulse signal having a frequency of, for example, 64 kHz, the LED drive signal 52 becomes a pulse signal that rises at the interval of, for example, five seconds.

The above-described cellular phone 5 has the following functions. As described above, the LED drive signal 52 is the pulse signal rising at the interval of, for example, five seconds and, if a turning on/off control of the LED 11 is performed in response to high (H) and low (L) of the LED drive signal 52, notification indicating the presence of any unattended incoming call can be realized.

Figure 4:
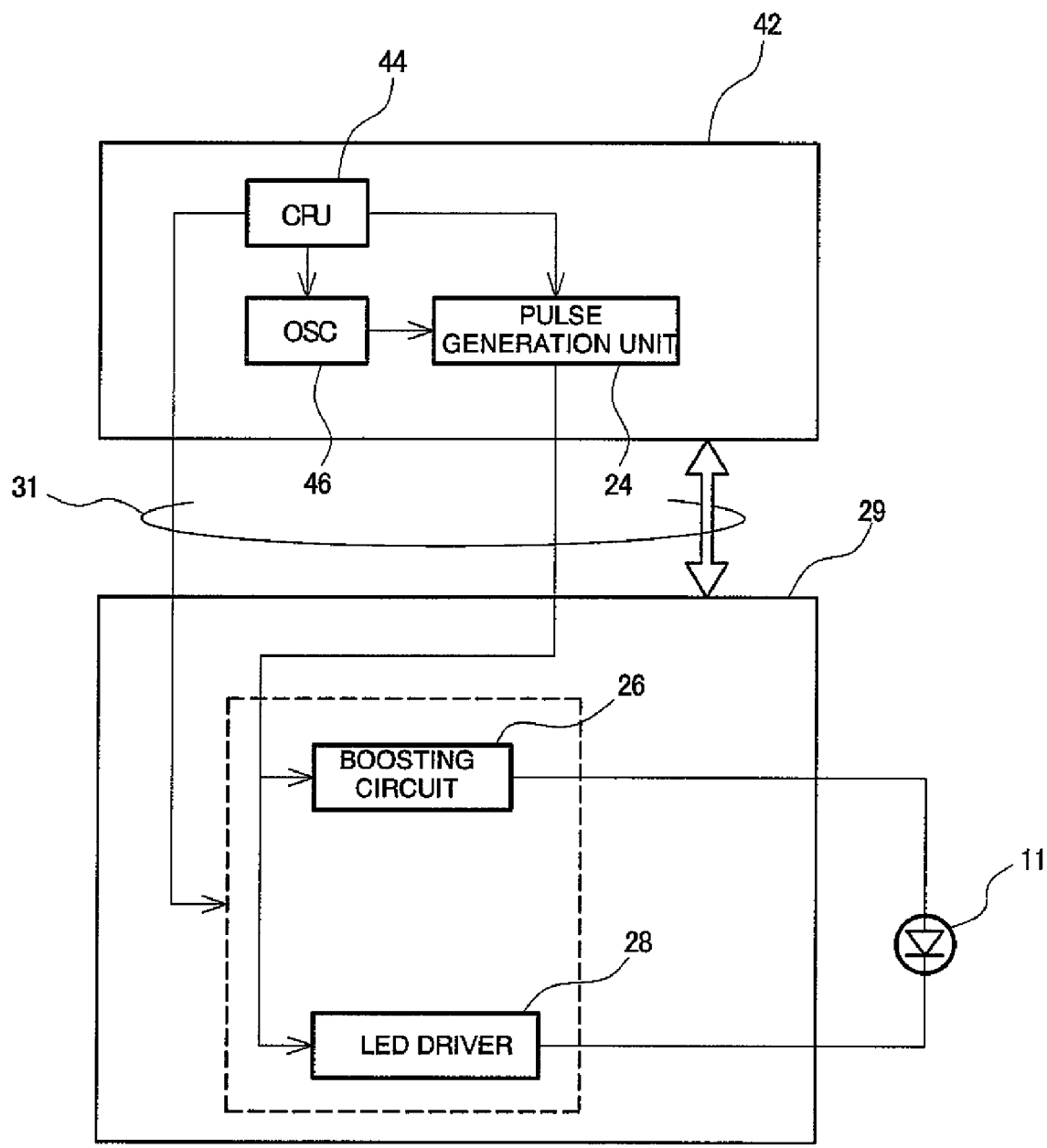
FIG. 4 is a block diagram illustrating a conventional light-emitting element driving apparatus.

FIG. 4 is a block diagram illustrating a conventional light-emitting element driving apparatus 150. According to the configuration illustrated in FIG. 4, the pulse generation unit 24 is provided on the first substrate 42, not on the second substrate 29 as illustrated in FIG. 2. In this case, the pulse generation unit 24 generates a pulse in response to an output of the control oscillator 46, not the output of the LED oscillator 22. However, in this case, it is necessary to supply the pulse of the pulse generation unit 24 to both the boosting circuit 26 and the LED driver unit 28. Therefore, a cable portion 31 connecting the second substrate 29 and the first substrate 42 requires an additional cable line.

In this respect, compared to the cable portion 31 of the conventional light-emitting element driving apparatus 150, the cable portion 30 of the light-emitting element driving apparatus 100 illustrated in FIG. 3 requires a smaller number of cable lines. Therefore, the cellular phone 5 can be downsized. The LED oscillator 22 is a circuit having a lower accuracy in pulse generation, and is more compact in configuration, compared to the control oscillator 46. The occupation rate of the LED oscillator 22 on the second substrate 29 can be reduced.

If the pulse generation unit 24 is provided on the first substrate, the pulse generation unit 24 is influenced by the CPU 44 and other noise generation sources. On the other hand, when the pulse generation unit 24 is provided in the light-emitting element driving circuit 10 on the second substrate, the amount of noise influencing the pulse generation unit 24 is relatively small. As described above, the LED drive signal 52 is the pulse signal rising at the interval of, for example, five seconds. When the LED drive signal 52 is in the low (L) period, both the boosting circuit 26 and the LED driver unit 28 are in the sleep state and therefore electrical power consumption by the cellular phone 5 can be reduced.

Figure 5:
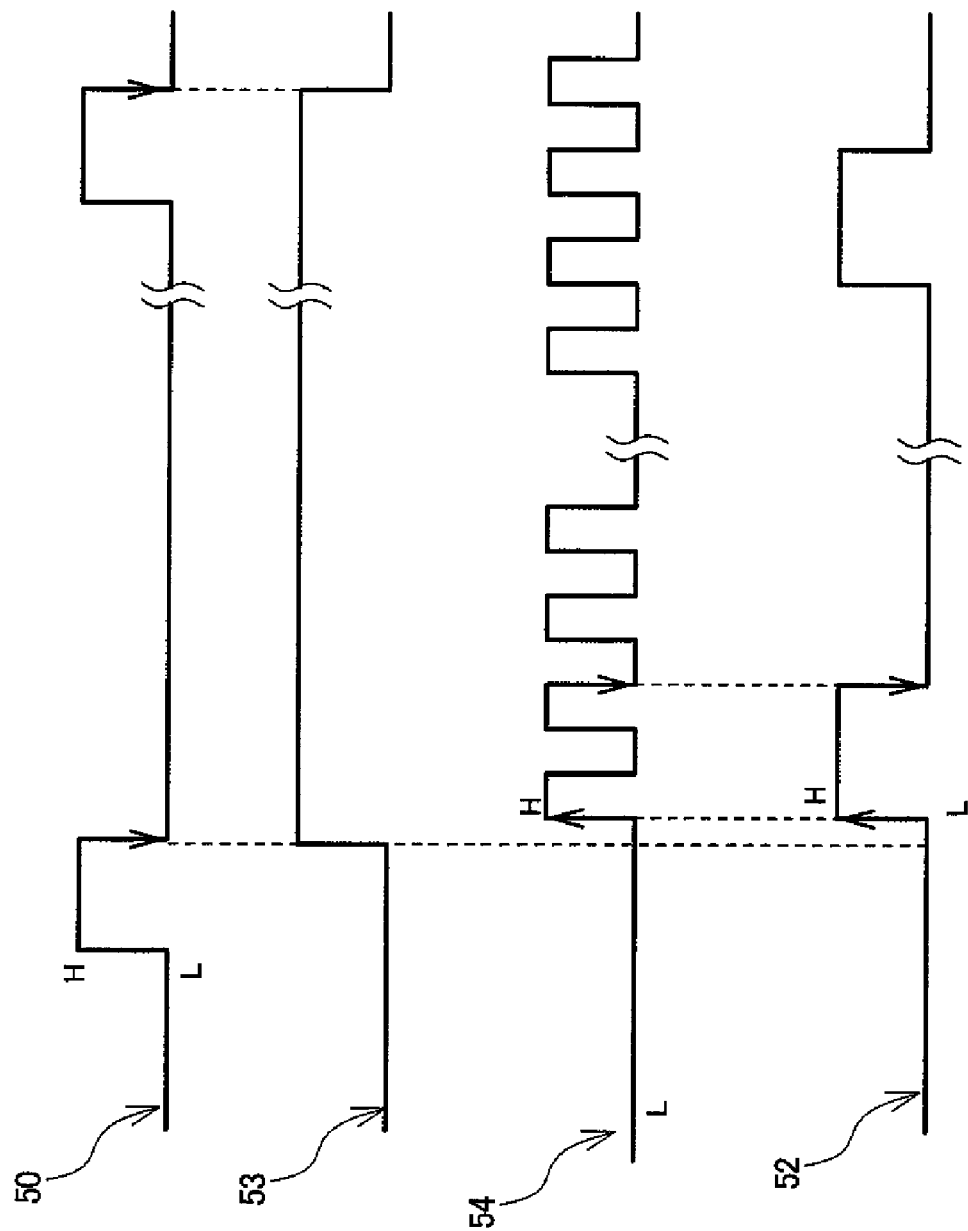
FIG. 5 illustrates an LED drive control signal, a reference pulse signal, and an LED drive signal according to another embodiment.

FIG. 5 illustrates an LED drive control signal, an LED drive signal, a pulse generation unit activation signal, and a reference pulse signal according to another embodiment. The LED drive control signal, the LED drive signal, and the pulse generation unit activation signal illustrated in FIG. 5 are identical to the LED drive control signal 50, the LED drive signal 52, and the pulse generation unit activation signal 53 illustrated in FIG. 3. The reference pulse signal 54 illustrated in FIG. 5 is different from the reference pulse signal 51 illustrated in FIG. 3. The reference pulse signal 54 starts oscillating in response to a fall of the LED drive control signal 50 supplied from the CPU 44. The LED drive signal 52 is generated in synchronization with the first rise of the reference pulse signal 54. Using the LED drive signal 52, the cellular phone 5 can notify a user of the presence of any unattended incoming call. Oscillation of the reference pulse signal 54 starts only when the rise of the LED drive control signal 50 is detected. Therefore, electrical power consumption by the cellular phone 5 can be reduced.

What is claimed is:

1. A light-emitting element driving circuit, which drives a light emitting element used in an electronic device, installed on a second substrate connected via a signal line to a first substrate, on which is mounted a control circuit configured to generate an LED drive control signal, the light-emitting element driving circuit comprising:
   a pulse generation unit configured to start and stop an operation based on the LED drive control signal, and output an LED drive signal when the pulse generation unit is in an active state;
   an LED oscillator configured to supply a reference pulse signal to the pulse generation unit; and
   an LED driver unit configured to cause a light-emitting element to perform a flickering operation based on the LED drive signal, wherein
   the LED oscillator is a circuit having a lower accuracy in frequency of the reference pulse signal, compared to a control oscillator in the control circuit mounted on the first substrate.

2. The light-emitting element driving circuit according to claim 1, further comprising a boosting circuit configured to perform boosting based on a voltage applied to an anode electrode of the light-emitting element,
   wherein the LED driver unit and the boosting circuit are in a state in which both boosting operation by the boosting circuit and flickering operation of the light-emitting element by the LED driver unit are stopped when the LED drive signal is in an L period.

3. A light-emitting element driving circuit, which drives a light emitting element used in an electronic device, installed on a second substrate connected via a signal line to a first substrate, on which is mounted a control circuit configured to generate an LED drive control signal, the light-emitting element driving circuit comprising:
   a pulse generation unit configured to start and stop an operation based on the LED drive control signal, and output an LED drive signal when the pulse generation unit is in an active state;
   an LED oscillator configured to supply a reference pulse signal to the pulse generation unit;
   an LED driver unit configured to cause a light-emitting element to perform a flickering operation based on the LED drive signal, and
   further comprising a boosting circuit configured to perform boosting based on a voltage applied to an anode electrode of the light-emitting element, wherein the LED driver unit and the boosting circuit are in a state in which both boosting operation by the boosting circuit and the flickering operation of the light-emitting element by the LED driver unit are stopped when the LED drive signal is in an L period.

4. A cellular phone comprising a first substrate on which is mounted a control circuit, and a second substrate connected to the first substrate via a signal line, and on which is mounted a light-emitting element driving circuit configured to drive a light-emitting element,
   wherein the light-emitting element driving circuit comprises:
      a pulse generation unit configured to start and stop an operation based on an LED drive control signal, and output an LED drive signal when the pulse generation unit is in an active state;
      an LED oscillator configured to supply a reference pulse signal to the pulse generation unit; and
      an LED driver unit configured to cause the light-emitting element to perform a flickering operation based on the LED drive signal, wherein
   the LED oscillator is a circuit having a lower accuracy in frequency of the reference pulse signal, compared to a control oscillator in the control circuit mounted on the first substrate.

5. The cellular phone according to claim 4, wherein the LED drive control signal is a signal to be generated when the cellular phone has an unattended incoming call.

* * * * *